(12) United States Patent
Escabi, II et al.

(10) Patent No.: US 9,075,819 B1
(45) Date of Patent: Jul. 7, 2015

(54) METHOD AND APPARATUS FOR PROVIDING PARALLEL BACKUP SET PROCESSING FOR CREATING A SYNTHETIC BACKUP

(75) Inventors: Zeir R. Escabi, II, Lake Mary, FL (US); Ynn-Pyng A. Tsaur, Oviedo, FL (US); Srineet Sridharan, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 744 days.

(21) Appl. No.: 11/395,040

(22) Filed: Mar. 31, 2006

Related U.S. Application Data (60) Provisional application No. 60/695,332, filed on Jun. 30, 2005.

(51) Int. Cl.
*G06F 17/30* (2006.01)

(52) U.S. Cl.
CPC .............................. *G06F 17/30162* (2013.01)

(58) Field of Classification Search
None
See application file for complete search history.

(56) References Cited

U.S. PATENT DOCUMENTS

| | | | |
|---|---|---|---|
| 5,778,395 A * | 7/1998 | Whiting et al. | 1/1 |
| 6,477,628 B1 * | 11/2002 | Bish et al. | 711/162 |
| 7,146,476 B2 * | 12/2006 | Sandorfi et al. | 711/162 |
| 7,266,655 B1 * | 9/2007 | Escabi et al. | 711/162 |
| 7,756,833 B2 * | 7/2010 | Van Ingen et al. | 707/640 |
| 8,572,434 B2 * | 10/2013 | Riegel et al. | 714/28 |
| 2005/0246510 A1 * | 11/2005 | Retnamma et al. | 711/162 |
| 2006/0041727 A1 * | 2/2006 | Adkins et al. | 711/162 |
| 2009/0307286 A1 * | 12/2009 | Laffin | 707/204 |

\* cited by examiner

*Primary Examiner* — Belix M Ortiz Ditren
(74) *Attorney, Agent, or Firm* — Campbell Stephenson LLP (57) ABSTRACT

A method of creating a synthetic backup set which can be used as a baseline for subsequent incremental backup or for the restoration of a data volume. The method includes copying a first data object from a first backup set to a memory media for storing the synthetic backup set, and copying a second data object from a second backup set to the memory media. The second data object is copied to the memory media when both the first and second backup sets are open for read access. In one embodiment, the first backup set data of data objects is stored on a first magnetic tape, and the second backup set data of data objects is stored on a second magnetic tape. When the second data object is copied to the memory media, the first and second magnetic tapes are simultaneously mounted on first and second tape drives, respectively.

20 Claims, 7 Drawing Sheets

METHOD AND APPARATUS FOR PROVIDING PARALLEL BACKUP SET PROCESSING FOR CREATING A SYNTHETIC BACKUP

CROSS-REFERENCE TO RELATED APPLICATIONS

The present patent application claims priority to U.S. Patent Application No. 60/695,332, filed on Jun. 30, 2005, entitled "Method and Apparatus for Providing Parallel Data Set Processing for Creating a Synthetic Backup", which is incorporated herein by reference in entirety.

BACKGROUND OF THE INVENTION

Data objects (e.g., databases, file directories, files within directories, email exchange mailboxes, etc.) are typically stored on memory devices such as hard disks. But hard disks fail at the worst times and take all the data objects stored on them with them when they go. This problem motivated the creation of backup systems. In general, backup systems copy data objects to separate memory media (e.g. magnetic tapes) at regularly scheduled times. If lost due to hardware failure or other reasons (software errors that corrupt the contents of data objects, or user errors such as inadvertent deletion of data objects) data objects can be restored to a known, consistent state using backed up copies stored on separate memory media.

Figure 1:
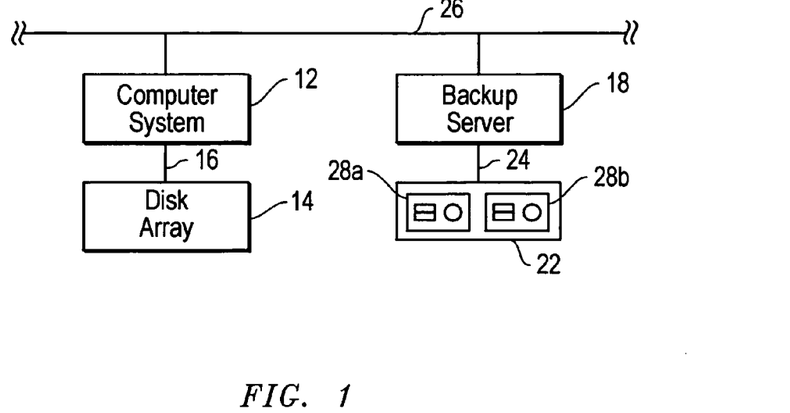
FIG. 1 illustrates a data processing system.

FIG. 1 illustrates in block diagram form, relevant components of a data processing system 10 which employs an exemplary backup system. For purposes of description only, the present invention will be described with reference to backing up files of a file system, it being understood that the present invention should not be limited thereto. Rather, the present invention could be used for backing up other types of data objects.

FIG. 1 shows a computer system 12 (e.g., an application server) coupled to a disk array 14 containing several hard disks. A volume manager or other software executing on computer system 12 or disk array 14, logically aggregates the hard disks to create a logical disk that stores a data volume V. Computer system 10 implements a file system that manages files and their respective metadata, which are stored on volume V. File metadata is data about data contained in a respective file. File metadata usually includes a filename. Metadata may also include information about its corresponding file's position within the hierarchy of a file system. In addition, file metadata may include file attributes or properties, time stamps, security information, lists of block addresses where each file's data is stored, etc. A file's attributes is typically defined by a multibit field, each bit of which is set to logical one or zero. One bit (the archive bit) indicates whether the data within the corresponding file has changed since some previous point-in-time (e.g., since the last time the file has been copied to backup memory via a backup operation). Another attributes bit (the read-only bit) indicates whether the corresponding file is a read-only file. Still another attributes bit (the directory bit) indicates whether the corresponding file is a directory. The metadata for a file may also include time stamps. For example, the metadata may include a modification time stamp indicating when the file was last modified via a write operation, a creation time stamp that indicates the date the file was created, an access time stamp indicating when the file was last accessed, etc.

Returning to FIG. 1, data processing system 10 includes a backup server 18 coupled to backup data storage subsystem (hereinafter backup memory system) 22 via storage interconnect 24. Backup memory system 22 may include a robotic tape handler (not shown) having access to several magnetic tapes (hereinafter backup tapes) upon which backup sets and/or backup catalogs (more fully described below) can be stored. Further, backup memory system 22 includes first and second tape drives 28a and 28b into which backup tapes are inserted as needed. Inserting a backup tape into a tape drive is often referred to herein as mounting the tape. Lastly, computer system 12 and backup server 18 are coupled to each other via local area network (LAN) 26. Although not shown, LAN 26 may be shared by several other computer systems.

As noted, files and their respective metadata are stored on volume V. Backup software executing on backup server 18 and/or computer system 12 operates to create backup sets or copies of files and metadata stored on volume V at regularly scheduled times. As will be more fully described below, backup operations may be full (including synthetic full) or incremental. A full backup operation produces a full backup set or a copy of all files (and associated metadata) stored on volume V. An incremental backup operation produces an incremental backup set or a copy of only those files (and associated metadata) that have changed since some previous event (e.g., a prior full or incremental backup operation). During backup operations, LAN 26 transmits copies of files and their metadata from disk array 14 to backup memory system 22 via backup server 18. For the purposes of explanation only, backup sets are data objects that contain copies of files from volume V.

For most applications, incremental backup is preferable at backup since, in most cases, the number of files on data volume V that change between backups is very small compared to the total number of files, and since the backup window (i.e., the time needed to perform the backup operation) may be small. If backup operations are performed daily or even more frequently, it is not uncommon for less than 1% of files to change between backups. An incremental backup operation in this case copies 1% of the data that a full backup would copy and uses 1% of the input/output (I/O) resources. Incremental backup appears to be the preferred mode of guarding data against hardware or software failure. And so it is, until a full restore of all files on data volume V is needed. In a full restore all files from newest full backup set are copied from tape back to disk array 14. Then files from the newer incremental backup sets are copied from respective tapes back to disk array 14. That can require a lot of backup tape handling performed by, for example, the robotic tape handler of backup memory system 22. For these reasons, restoration from a single backup set is generally simpler and more reliable than restore from combinations of full and incremental backup sets. For recovering from individual user errors, the situation is just the opposite. Users tend to work with one small set of files on volume V for a period of days or weeks and then work with a different set. Accordingly, there is a high probability that a file corrupted or lost as a result of user error will have been used recently and therefore will be copied in one of the incremental backup operations. Since incremental backup sets contain a smaller fraction of data than a full backup set, they can usually be searched much faster if a restore of a particular file is needed. The ideal from the individual user's standpoint is therefore many small incremental backup operations. Some backup systems offer a compromise: the ability to consolidate a baseline full backup set and several incremental backup sets into a new, more up to date full backup set, which becomes the baseline for further incremental backup operations. While costly in terms of the time needed to create them, these synthetic full backup sets can simplify restoration processes.

Figure 2:
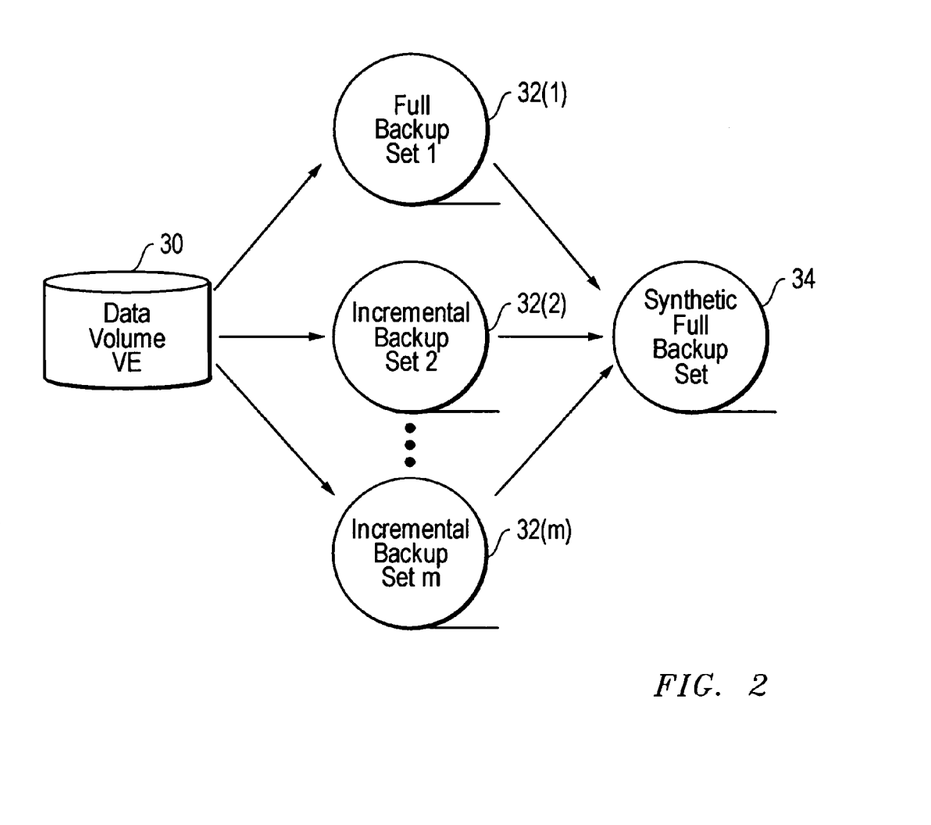
FIG. 2 illustrates backup sets of a data volume stored in the data processing system of FIG. 1.
Figure 3:
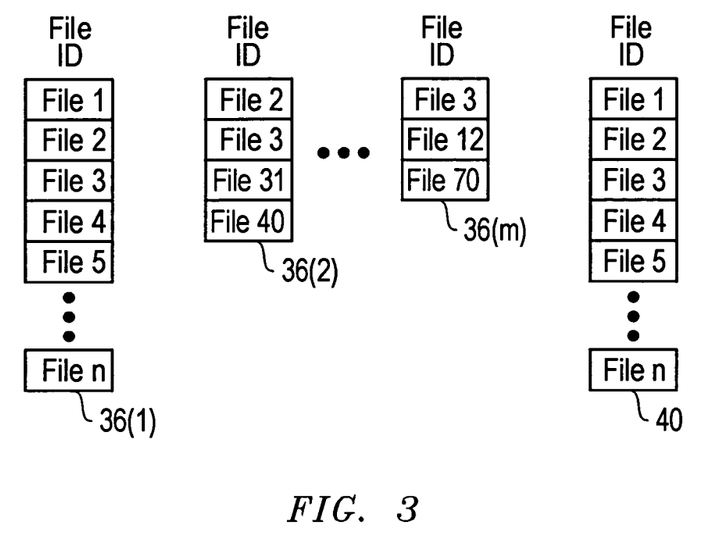
FIG. 3 illustrates catalogs that list the contents of backup sets in FIG. 2.
Figure 4:
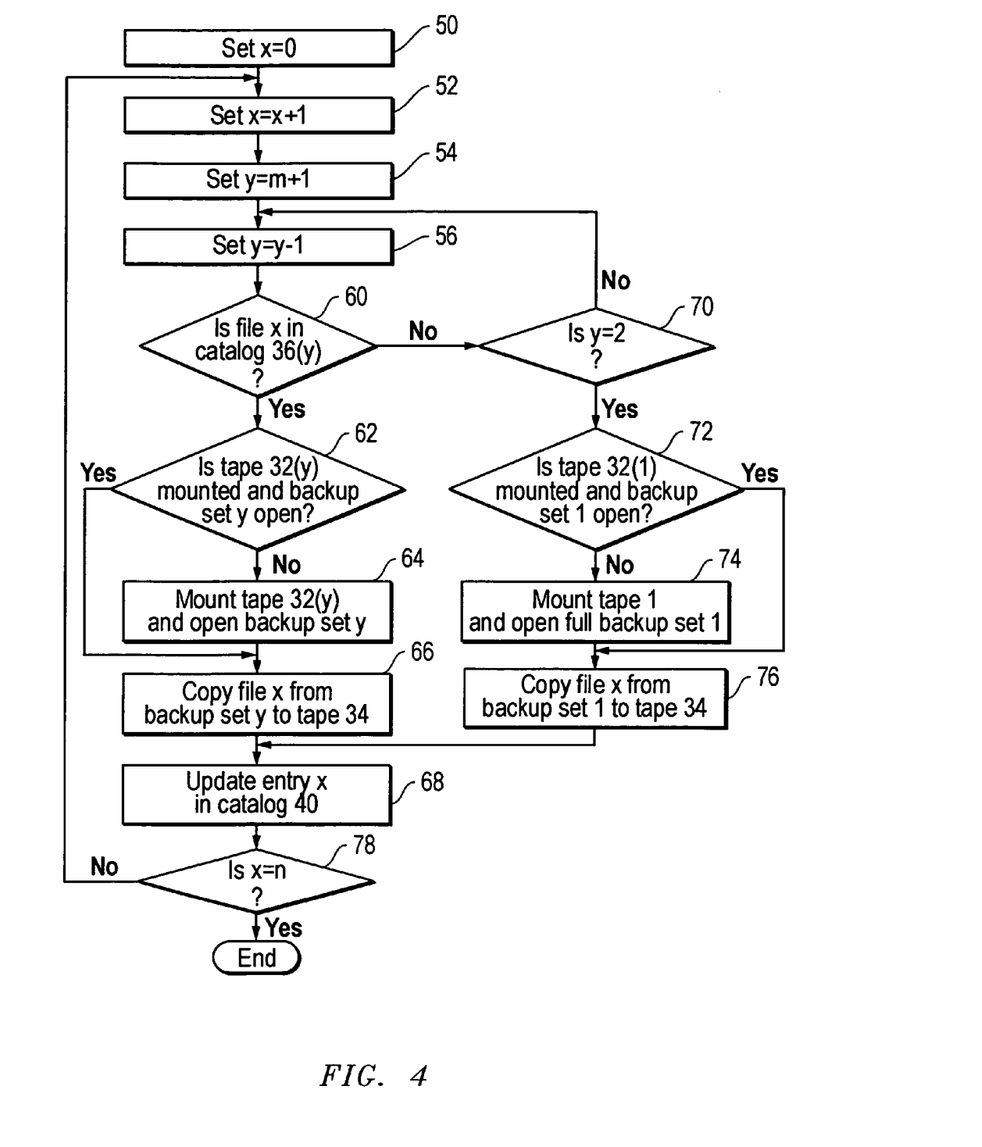
FIG. 4 illustrates relevant aspects of creating a synthetic full backup set using the catalogs shown in FIG. 3.

FIGS. 2-4 illustrate relevant aspects of creating full, incremental and synthetic full backup sets of files stored on volume V. FIG. 2 shows a logical disk 30 and several backup tapes 32(1)-32(m) and 34. The logical disk 30 stores the contents of data volume V while the backup tapes are used to store backup sets. Backup server 18 creates a full backup set 1 on backup tape 32(1). The full backup set 1 includes a copy of all files (and associated meta data) stored on volume V at the time of the full backup operation. Backup server 18 also sequentially creates incremental backup sets 2-m on backup tapes 32(2)-32(m), respectively, after creating full backup set 1. It is noted that several backup sets could be stored on a single backup tape. However, it will be assumed, except where otherwise noted, that each backup tape stores a single backup set. Eventually, backup server 18 creates a synthetic full backup on backup tape 34 from files of some or all of backup sets 1-m. All backup tapes 32(1)-32(m) and 34 are accessible by the robotic tape handler of backup memory 22.

Computer system 12, in one embodiment, creates a backup set catalog (catalog) during each full or incremental backup operation. The catalogs identify files copied during backup operations. Moreover, the catalogs list the order in which files are copied to and stored on backup tapes. Once created, the catalogs are provided for subsequent use by server 18. FIG. 3 shows backup catalogs 36(1)-36(m) corresponding to backup sets 1-m, respectively. Each of the catalogs 36(1)-36(m) identifies the files of backup sets 1-m, respectively, in addition to the order in which files of backup sets 1-m, respectively, were copied to backup tapes 32(1)-32(m), respectively. Although not shown, catalogs 36(1)-36(m) may identify locations in tapes 32(1)-32(m), respectively, where copied files can be accessed. For example, each catalog entry may contain a file offset and file size in addition to the file identification (file ID). All catalogs may be stored in cache memory (not shown) of backup server 18. The need for backup catalogs will become more apparent while describing the process for creating synthetic full backup sets below.

Backup server 18 creates incremental backup sets after creating a full backup set as noted above. To illustrate, backup server 18 creates incremental backup set 2 on tape 32(2) after backup server creates full backup set 1 on backup tape 32(1), where backup set 2 includes a copy of all files within volume V that were modified (e.g., written) since the creation of full backup set 1. There are many ways to identify files that have been modified since the creation of the full backup set 1. For example, backup server 18 or an agent executing on computer system 12, may use modification time stamps to determine which files on volume V have been modified and should be copied to tape 32(2) during the incremental backup operation. Each time the contents of a file or its metadata are modified, the file system may update the file's modification time stamp to equal the time when the modification successfully completes. Server 18 or an agent executing on computer system 12 may traverse the modification time stamps for the files on volume V, and when a time stamp is found with a date that is later in time than the time when the last backup operation occurred, the associated file (and its metadata) is deemed modified and subsequently copied to backup tape 32(2). This process is repeated until the modification time stamp for all files on volume V have been examined. In an alternative method, backup server 18 or an agent executing on computer system 12 may use the archive bit of the attributes field to determine which files on volume V should be copied to backup tape 32(2) during the incremental backup operation. When a file or its metadata is modified, the file's archive-bit may be set to logical one by the file system. During an incremental backup operation, the archive bits are traversed, and when an archive bit is found that is set to logical 1, the associated file (and its metadata) is deemed modified and subsequently copied to backup tape 32(2). After copying, the archive-bit is set back to logical zero. This process is repeated until the archive bits for all files have been traversed.

Backup server 18 can create the synthetic full backup set of files on volume V using one or more of the backup sets 1-m and their associated catalogs. In general, the synthetic full backup contains the most recent version of each file currently stored on volume V. Tape 34 shown in FIG. 2 is configured to store the synthetic full backup set created by backup server 18. The contents of the catalogs 36(1)-36(m) can be used to determine which files of the backup sets 1-m are to be combined to create the synthetic full backup set. It is noted that during the creation of the full or incremental backup sets, one or more files of data volume V may have been deleted or added. However, for sake of description simplicity, it will be presumed that no files are added to or deleted from volume V during the backup processes described above.

FIG. 4 illustrates relevant operational aspects of a process for creating a synthetic full backup set using catalogs 36(1)-36(m) and backup sets 1-m. Before the process FIG. 4 begins, a catalog of files currently stored on volume V is created. FIG. 3 shows exemplary catalog 40 which lists all files currently stored on volume V. Catalog 40 is used to identify which files are needed from backup sets 1-m to create the synthetic full backup set on tape 34. After catalog 40 is created, a variable x set to 0 and incremented by one as shown in steps 50 and 52 in FIG. 4. Backup server 18 then sets a variable y to m+1 and decrements y by 1 as shown in steps 54 and 56. Backup server 18 then begins a search for the most recent version of file x identified by catalog 40. More particularly, backup server 18 accesses catalog 36(y) to determine whether the most recent version of file x is contained within incremental backup set y as shown in step 60. For the purposes of explanation, it will be presumed that catalogs 36(1)-36(m) are accessible in cache memory of server 18.

When the process shown in FIG. 4 is first started, backup server 18 starts with catalog 36(y=m) in step 60 because it corresponds to the most recently created incremental backup set m. If catalog 36(y) indicates that file x is contained within incremental backup set y, then backup server 18 copies file x from tape 32(y) to tape 34 as shown in step 66, if tape 32(y) is mounted and the data object that contains the backup set y is open. As noted above, backup memory system 22 has only two tape drives, tape drive 28a and tape drive 28b. During the process shown in FIG. 4, tape 34 is mounted on tape drive 28b and configured to receive and store files of the synthetic full backup set. If backup server 18 determines that file x is in catalog 36(y) as shown in step 60, but tape 32(y) is not mounted on drive 28a, then the process proceeds to step 64 where the robotic tape handler removes the backup tape from drive 28a and mounts tape 32(y). It is noted that backup server 18 may have to close any opened data object that contains a backup set of the backup tape mounted on tape drive 28a before the robotic handler removes the backup tape. After tape 32(y) is mounted on drive 28a, backup server 18 opens the data object that contains backup set y so that file x can be copied from tape 32(y) to tape 34 as shown in step 66. Once file x is copied to tape 34, backup server 18 may update entry x of catalog 40 to include location information (i.e., file offset and file size) where file x can be found on tape 34. For purposes of explanation, it will be presumed that opening a backup set is meant to mean opening a data object (e.g., a file) that contains the backup set.

If backup server 18 determines that file x is not identified in catalog 36(y) in step 60, the process proceeds to step 70 where backup server 18 determines whether incremental backup set y is the first incremental backup set created after full backup set 1. Backup server 18 makes this determination by comparing the current state of variable y to 2. If y equals 2 in step 70, then the newest version of file x is contained in full backup set 1 and is copied from tape 32(1) to tape 34 as shown in step 76, if tape 32(1) is mounted on drive 28a of the backup memory system 22. If tape 32(1) is not mounted, the robotic tape handler swaps the existing tape mounted on drive 28a with backup tape 32(1), and backup server 18 opens backup set 1. Backup server 18 may have to close the backup set stored on the tape in drive 28a before the robotic tape handler swaps tapes. In step 76 backup server 18 copies file x from tape 32(1) to tape 34 as shown in step 76. In step 68, backup server 18 optionally updates entry x of catalog 40 to include location information where file x, copied in step 76, can be found.

If backup server 18 determines in step 70 that y does not equal 2, then incremental backup set y is not the first incremental created after full backup set 1, and the process proceeds to step 56 where y is decremented and step 60 is repeated. Eventually, the most recent version of file x is found and copied to tape 34 in step 66 or 76, and catalog 40 is optionally updated accordingly. Thereafter, steps 54-64 are repeated for the next file of catalog 40. After all of the most recent versions of files 1-n have been copied to tape 34, the process shown in FIG. 4 ends.

When creating the synthetic full backup set, files are copied to tape 34 in the order defined by catalog 40, beginning with file 1 and ending with file n. One of ordinary skill can see from FIG. 4 that at a substantial amount of processing and backup tape handling is needed for backup server 18 to create the synthetic full backup set on tape 34. Indeed, one of ordinary skill can appreciate that any one of the full or incremental backup sets 1-m may be opened and closed many times during the process to create the synthetic full backup set, since the order in which files are copied to tape 34 is defined by catalog 40. Moreover, it can be seen that any one of the backup tapes 32(1)-32(m) may be repeatedly mounted and removed from tape drive 28a during the process shown in FIG. 4.

SUMMARY OF THE INVENTION

A method of creating a synthetic backup set which can be used as a baseline for subsequent incremental backup sets or to restore a data volume to a prior data state. The method includes copying a first data object from a first backup set to a memory media for storing the synthetic backup set, and copying a second data object from a second backup set to the memory media. The second data object is copied to the memory media when both the first and second backup sets are open for read access. In one embodiment, the first backup set data of data objects is stored on a first magnetic tape, and the second backup set data of data objects is stored on a second magnetic tape. When the second data object is copied to the memory media, the first and second magnetic tapes are simultaneously mounted on first and second tape drives, respectively. The data objects of the synthetic backup set can be stored on the memory media in any order or layout. In one embodiment, the data objects of the synthetic backup set can be stored on the memory media in the same layout as traditional full backup sets. In another embodiment, the data objects of the synthetic backup set can be stored on the memory media in a layout different from that used when creating a traditional full backup set and which facilitates a more efficient restore of a data volume.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

In one embodiment of the present invention, several backup sets remain simultaneously open during synthetic full backup set creation. This enables a method of parallel backup set processing for creating a synthetic full backup set. Parallel backup set processing can reduce the time needed to create a synthetic full backup set in addition to providing other benefits.

In the following description, the preferred embodiment of the present invention could be implemented as a computer program executing on a processor of a computer system such as a backup server, although those skilled in the art will readily recognize that the equivalent of such software may also be constructed in hardware. If the invention is implemented as a computer program, the program may be stored in a conventional computer readable medium that may include, for example: magnetic storage media such as a magnetic disk (e.g., a floppy disk or a disk drive), or magnetic tape; optical storage media such as an optical disk, optical tape, or machine readable barcode; solid state electronic storage devices such as random access memory (RAM), or read-only memory (ROM); or any other device or medium employed to store computer program instructions.

Figure 5:
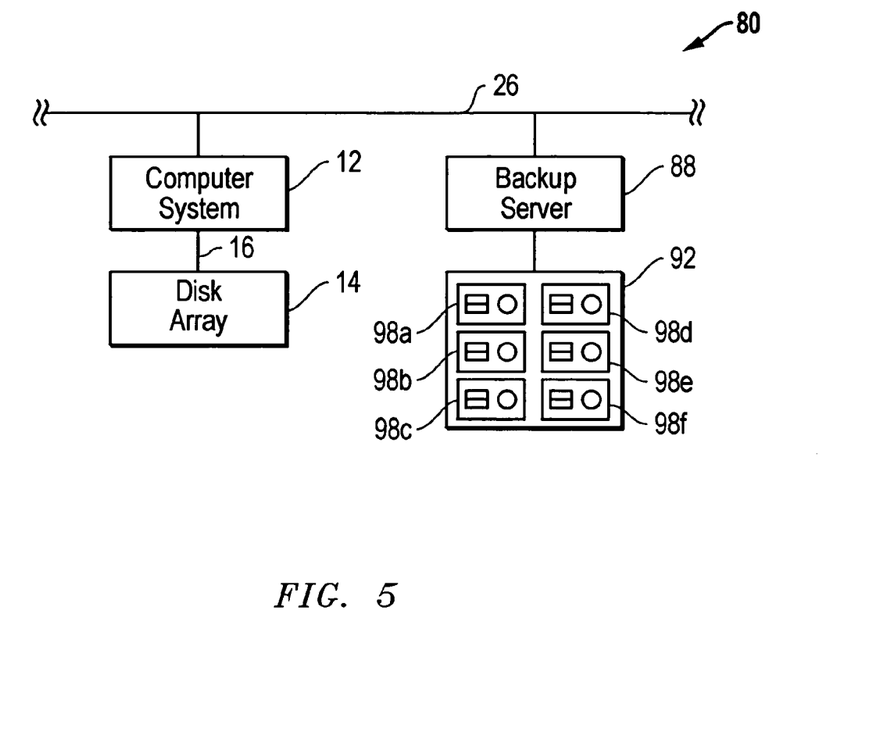
FIG. 5 illustrates a data processing system.

FIG. 5 illustrates in block diagram form, relevant components of a data processing system 80 which employs one embodiment of the present invention. FIG. 5 shows the data processing system 10 of FIG. 1 with backup server 18 replaced by backup server 88, and with backup memory system 22 replaced with backup data storage subsystem (hereinafter backup memory system) 92. In the embodiment shown, backup memory system 22 includes a robotic tape handler (not shown) having access to several magnetic tapes (hereinafter backup tapes) on which backup sets and/or backup catalogs can be stored. Further, backup memory system 92 includes tape drives 98a-98f into which the robotic tape handler may insert or remove backup tapes as needed. Lastly, computer system 12 and backup server 88 are coupled to each other via LAN 26.

Figure 6:
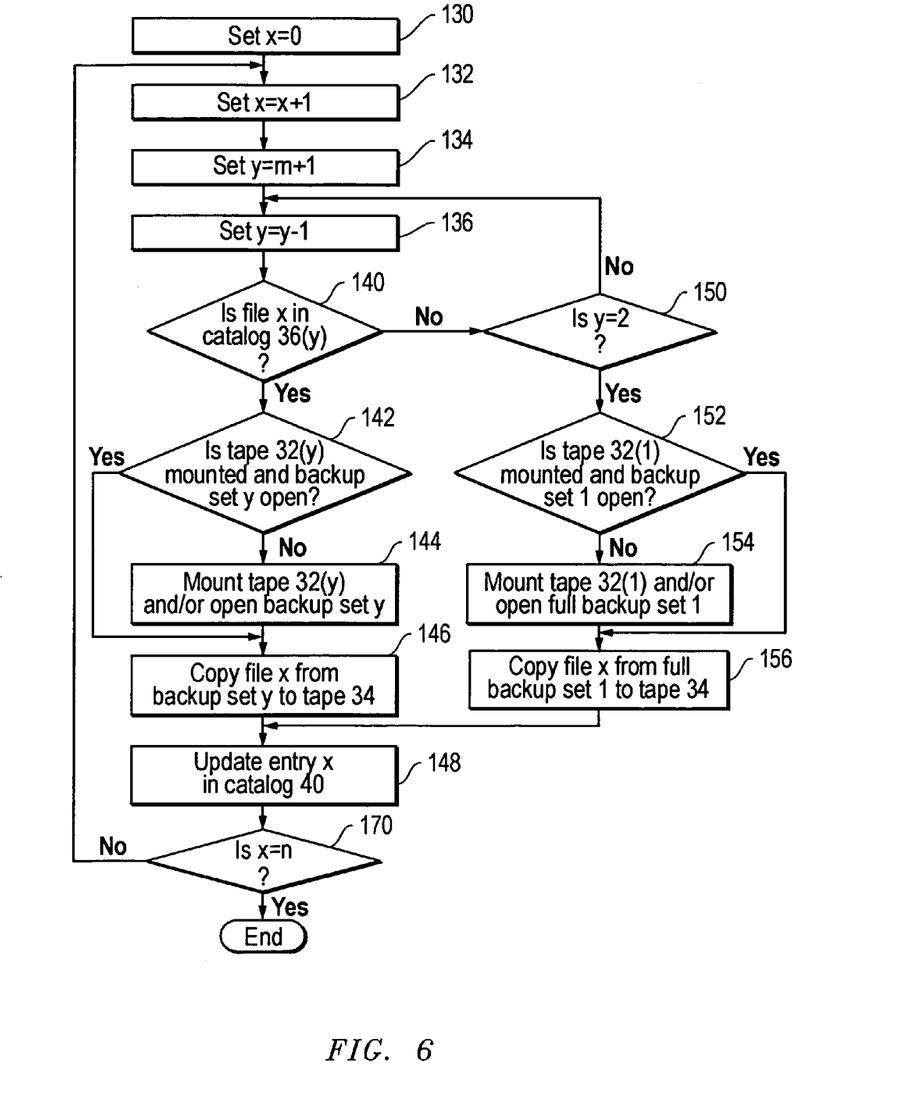
FIG. 6 illustrates relevant aspects of creating a synthetic full backup set of the data volume stored in the data processing system of FIG. 5.

Backup software executing on backup server 88 and/or computer system 12 operates to backup files and associated metadata stored on volume V. Backup operations may be full (including synthetic full) or incremental. For purposes of explanation, the process employed in embodiment of FIG. 5 for creating full and incremental backup sets is the same as the process of creating full and incremental backup sets described in the background section above. The process implemented by backup server 88 for creating a synthetic full backup set of files stored on volume V, however, is different than that described in the background section. FIG. 6 illustrates relevant aspects of creating a synthetic full backup set of files stored on volume V in accordance with one embodiment of the present invention. The present invention will be described with reference to creating a synthetic full backup set on tape 34 from files of some or all of backup sets 1-m shown in FIG. 2. It is noted that in an alternative embodiment, the synthetic full backup set may be created on a disk (not shown) accessible by server 88 rather than on tape. Disks are preferable for synthetic full backup sets since read access to disks is quicker during a restoration operation than read access to tape. However, the embodiment of the present invention shown in FIGS. 5 and 6 will be described with reference to creating a synthetic full backup set on tape 34, it being understood that the present invention should not be limited thereto. For purpose of explanation, it will be presumed that tape 34 is mounted on tape drive 98f of backup memory system 92 even though this is not shown in FIG. 5.

FIG. 6 illustrates relevant operational aspects of a process for creating a synthetic full backup set using the catalogs 36(1)-36(m) and backup sets 1-m of FIG. 2. U.S. patent application Ser. No. 10/834,446 entitled Synthesized Backup Set Catalogs describes an alternative method of creating catalogs that could be used in the present invention. U.S. patent application Ser. No. 10/834,446 was filed on Apr. 29, 2004, and is incorporated herein by reference in its entirety.

Before the process of FIG. 6 begins, computer system 12 creates catalog 40, which lists files currently stored on volume V. Catalog 40 is used to identify which files are to be copied from backup sets 1-m to create the synthetic full backup set on tape 34. Moreover, catalog 40 identifies the order in which files are to be copied to tape 34 as will be more fully described below. Catalog 40 is provided to backup server 88. In another embodiment, a synthesized backup set catalog generated during an incremental backup operation in accordance with U.S. patent application Ser. No. 10/834,446 could be selected and used to create a synthesized full backup set of the files stored on volume V at a prior point in time (i.e., the time when the incremental backup operation occurred), which in turn can be used to restore volume V to that prior point in time. In this embodiment, the synthesized backup set catalog would be used instead of a newly generated catalog 40 when generating the synthesized full backup set of the files stored on volume V at the prior point in time.

Returning to FIG. 6, a variable x set to 0 and incremented by one as shown in steps 130 and 132 in FIG. 6. Backup server 88 then sets a variable y to m+1 and decrements y by 1 as shown in steps 134 and 136. In the embodiment where the synthesized backup set catalog is used instead of catalog 40, variable y is set to p+1, where p identifies the incremental backup set corresponding to the selected synthesized backup set catalog. FIG. 6 (and FIG. 9 below), however will be described with reference to using catalog 40.

Backup server 88 begins a search for the most recent version of file x identified in catalog 40. More particularly, backup server 88 accesses catalog 36(y) to determine whether file x is contained within incremental backup set y as shown in step 140. For the purposes of explanation, it will be presumed that catalogs 36(1)-36(m) are accessible in cache memory of server 88.

When the process shown in FIG. 6 is first started, backup server 88 starts its search for file x with catalog 36(y=m) in step 140 because it corresponds to the most recently created incremental backup dataset m. If catalog 36(y) indicates that file x is contained within incremental backup set y, then backup server 88 copies file x from tape 32(y) to tape 14 as shown in step 146, if tape 32(y) is mounted and backup set y is open. As noted above, backup memory system 92 has six tape drives 98a-98f. During the process shown in FIG. 6, tape 34 is mounted on tape drive 98f and configured to receive and store files of the synthetic full backup set. Five of the backup tapes 32(1)-32(m) may be simultaneously mounted on tape drives 98a-98e, respectively. Moreover, the five backup sets of the five simultaneously mounted backup tapes, may be simultaneously opened for read access. Backup set access code that is executing on backup server 88 is responsible for opening a backup set in order to read files contained therein. In order to simultaneously open two or more opened backup sets, two or more instances of the backup set access code may be needed on backup server 88. Backup software executing on server 88 with the help of the operating system, may track which backup sets are open. When opening a backup set, the backup software may reserve buffer memory (not shown) into which data of one or more files read from the opened backup set can be temporarily stored. Thus, each opened backup set may have its own reserved buffer memory that is maintained by the backup software. The backup software typically performs other functions when opening a backup set. Each of these backup software functions should be implemented each time a backup set is opened. Moreover, the backup software may need to perform one or more functions when closing a backup set, such as performing a security check or releasing reserved buffer memory. As can be seen, the opening of a backup set for read access involves the backup software (and possibly the operating system) executing on backup server 88. Likewise the closing of a backup set involves the backup software (and possibly the operating system) executing on backup server 88. If several backup sets can remain open at a given time, files from the opened backup sets can be copied to tape 34 without first having to close any of the opened backup sets.

If backup server 88 determines that file x is in catalog 36(y) as shown in step 140, but tape 32(y) is not mounted on one of the drives 98a-98e, then the process proceeds to step 144 where the robotic handler of backup memory system 22 removes the backup tape from, for example, drive 98a and mounts tape 32(y). It is noted that backup server 88 may have to close a backup set before the robotic tape handler removes the backup tape from drive 98a. After tape 32(y) is mounted, backup server 88 opens backup set y so that file x can be copied from tape 32(y) to tape 34 as shown in step 146. Once file x is copied to tape 34, backup server 88 optionally updates entry x of catalog 40 to include location information (i.e., file offset and file size) on tape 34 for file x copied thereto.

If backup server 88 determines that file x is not identified in catalog 36(y) in step 140, the process proceeds to step 150 where backup server 88 determines whether incremental backup set y is the first incremental created after full backup set 1. Backup server 88 can determine this by comparing the current state of variable y to 2. If y equals 2 in step 150, then backup set y is the first incremental created after the creation of full backup set 1, and file x contained in full backup set 1 is copied from tape 32(1) to tape 34 as shown in step 156, if tape 32(1) is mounted on one of the drives 98a-98e of the backup memory system 92. If tape 32(1) is not mounted, backup server 88 closes any opened backup set on the backup tape mounted on a drive (e.g., drive 98b). The robotic tape handler then swaps the existing tape mounted on drive 98b with backup tape 32(1), and backup server 88 opens backup set 1. In step 156 backup server 88 then copies file x from tape 32(1) to tape 34. In step 148, backup server 88 optionally updates entry x of catalog 40 to include location information (e.g., offset and file size) for file x copied in step 156. It is noted that if more than five backup tapes are used to store backup sets that store files needed to create the synthetic backup set, the robotic handler may have to swap tapes during the process since only six disk drives are available, one of which is used to mount the tape on which the synthetic backup set is created.

If backup server 88 determines in step 150 that y does not equal 2, then backup set y is not the first incremental backup set created after full backup set 1, and the process proceeds to step 136 where y is decremented and step 140 is repeated. Eventually, the most recent version of file x is found and copied to tape 34 in step 146 or 156, and catalog 40 is optionally updated. Thereafter, steps 132-140 are repeated for the next file identified in catalog 40. After all of the most recent versions of files 1-n have been copied to tape 34, the process shown in FIG. 6 ends.

Figure 7:
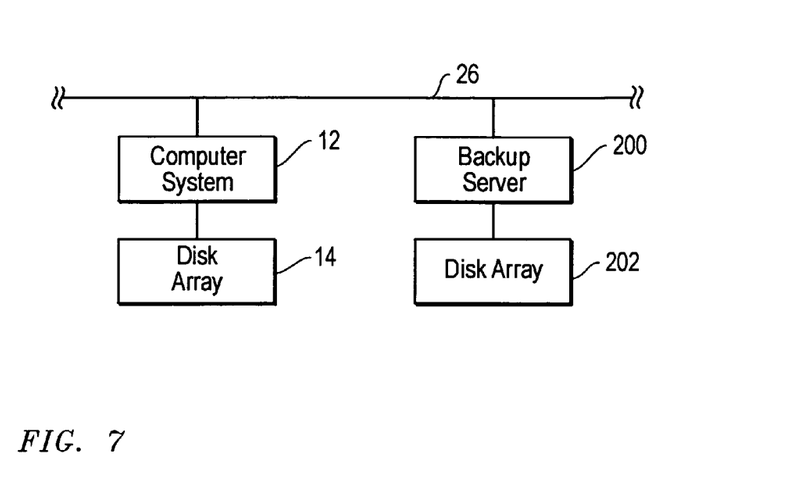
FIG. 7 illustrates a data processing system.
Figure 8:
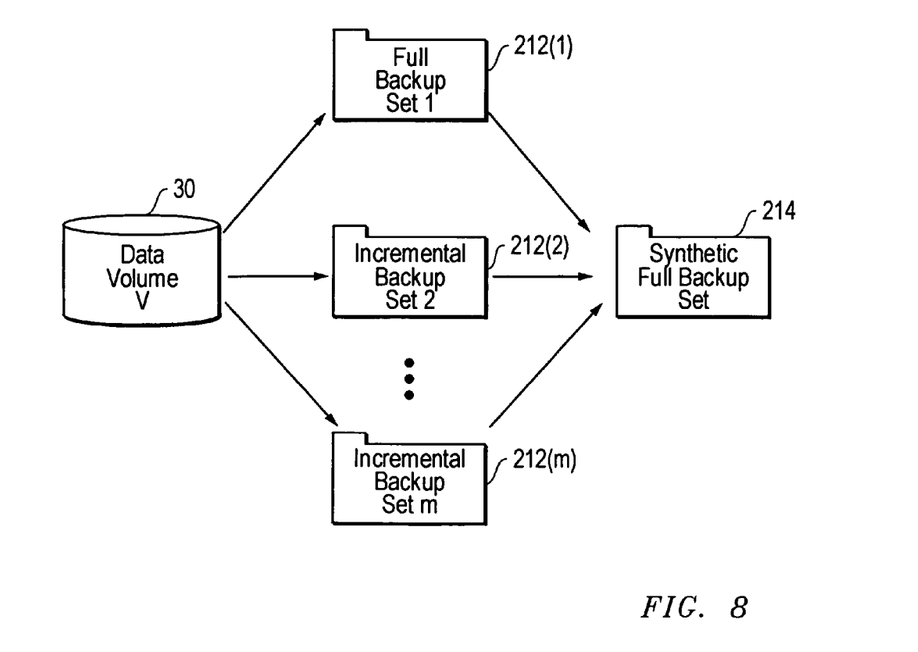
FIG. 8 illustrates backup sets of the data volume stored in the data processing system of FIG. 7.
Figure 9:
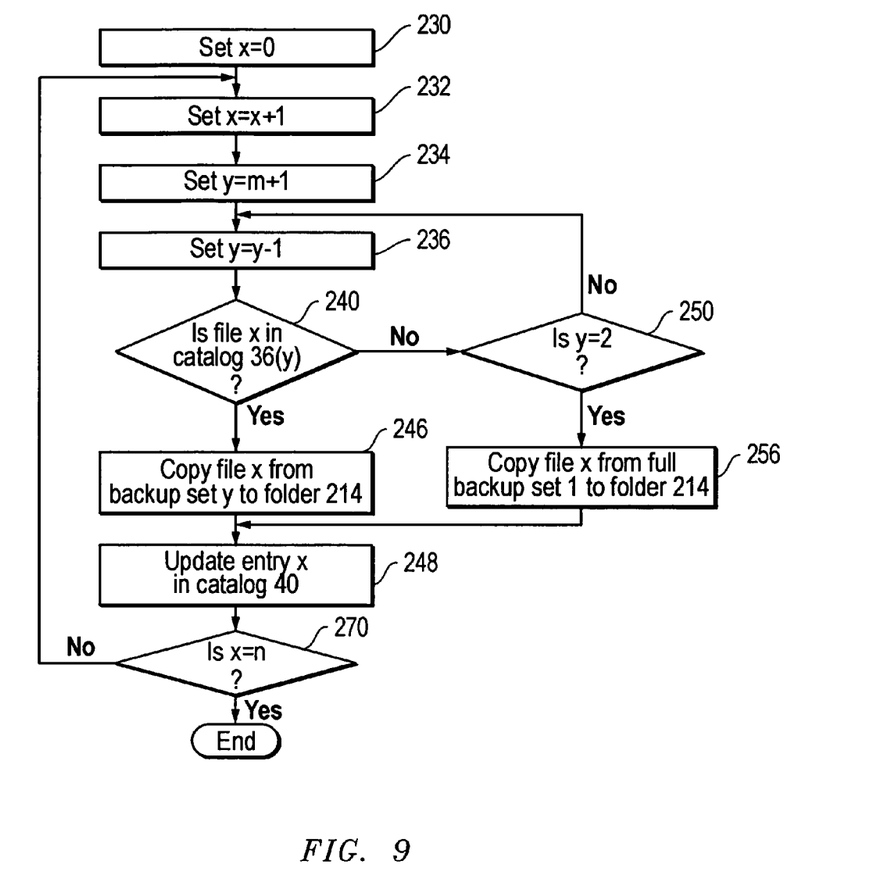
FIG. 9 illustrates relevant aspects of creating a synthetic full backup set of a data volume stored in the data processing system of FIG. 7.

FIGS. 5 and 6 describe an implementation in which backup tapes are used to store full, incremental, and synthetic full backup sets. The present invention should not be limited thereto. For example, the present invention could be employed in a data processing system in which hard disks or RAM (e.g., static RAM, dynamic RAM, synchronous dynamic RAM, etc.) is used for storing full, incremental, and synthetic full backup sets. To illustrate, FIGS. 7-9 illustrate an implementation in which hard disks are used to store full, incremental, and synthetic full backup sets. More particular, FIG. 9 shows the data processing system of FIG. 5 with backup server 88 and backup memory system 92 replaced with backup server 200 and disk array 202, respectively. In this embodiment, a volume manager or other software logically aggregates the hard disks of disk array 202 to create a logical disk (hereinafter backup disk) that stores backup sets. In another embodiment, the backup disk may be formed using Redundant Array of Independent (or Inexpensive) Disks (RAID) technology.

Backup software executing on backup server 200 and/or computer system 12 operates to backup files and associated metadata stored on volume V. Backup operations may be full (including synthetic full) or incremental. For purposes of explanation, the process employed in embodiment of FIG. 7 for creating full and incremental backup sets is similar to the process of creating full and incremental backup sets described above. However, in the embodiment of FIG. 7, the backup sets are stored in files on the backup disk rather than on backup tapes. More particularly as shown in FIG. 8, backup sets 1-m that are described above, are stored in files 212(1)-212(m), respectively, of the backup disk. Backup server 200 creates a full backup set 1 which is stored in file 212(1) on the backup disk. The full backup set includes a copy of all files (and associated meta data) stored on volume V at the time of the full backup operation. Backup server 200 also creates incremental backup sets 2-m which are stored in respective files 212(2)-212(m) on the backup disk. The full and incremental backup sets 1-m shown in FIG. 8 contain the same files that are contained in the full and incremental backup sets 1-m shown in FIG. 2.

FIG. 9 illustrates relevant operational aspects of a process for creating a synthetic full backup set using catalogs 36(1)-36(m) and files from one or more of the backup sets 1-m stored in files 212(1)-212(m), respectively, of the backup disk. The synthetic full backup set created using the process of FIG. 9 is stored in file 214 on the backup disk. All folders 212(1)-212(m) and 214 are accessible by backup server 200. Moreover one or more or all files 212 and the backup sets contained therein, may be simultaneously open during the process of FIG. 9.

Before the process of FIG. 9 begins, computer system 12 creates catalog 40, which lists files currently stored on volume V. Catalog 40 is provided to backup server 200. Thereafter, a variable x set to 0 and incremented by one as shown in steps 230 and 232 in FIG. 9. Backup server 200 then sets a variable y to m+1 and decrements y by 1 as shown in steps 234 and 236. Backup server 200 then begins a search for the most recent version of file x identified in catalog 40. More particularly, backup server 200 accesses catalog 36(y) to determine whether file x is contained within incremental backup set y as shown in step 240. For the purposes of explanation, it will be presumed that catalogs 36(1)-36(m) are accessible in cache memory of server 200.

When the process shown in FIG. 9 is first started, backup server 200 starts its search for file x with catalog 36(y=m) in step 240 because it corresponds to the most recently created incremental backup dataset m. If catalog 36(y) indicates that file x is contained within incremental backup set y, then backup server 200 copies file x from folder 212(y) to folder 214 as shown in step 246. During the process shown in FIG. 9, folder 214 is open and configured to receive and store files of the synthetic full backup set. All hard disks of disk array 202 are simultaneously mounted, and each of the backup sets 1-m in folders 212(1)-212(m) are open and read accessible.

If backup server 200 determines that file x is not identified in catalog 36(y) in step 240, the process proceeds to step 250 where backup server 200 determines whether incremental backup set y is the first incremental created after full backup set 1. Backup server 200 can determine this by comparing the current state of variable y to 2. If y equals 2 in step 250, then backup set y is the first incremental created after the creation of full backup set 1, and file x contained in full backup set 1 is copied from folder 212(1) to folder 214 as shown in step 256. In step 248, backup server 200 optionally updates entry x of catalog 40 to include location information for file x copied in step 256.

If backup server 200 determines in step 150 that y does not equal 2, then backup set y is not the first incremental backup set created after full backup set 1, and the process proceeds to step 236 where y is decremented and step 240 is repeated. Eventually, the most recent version of file x is found and copied to folder 214 in step 246 or 256, and catalog 40 is optionally updated. Thereafter, steps 232-240 are repeated for the next file identified in catalog 40. After all of the most recent versions of files 1-n have been copied to folder 214, the process shown in FIG. 9 ends.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method of creating a synthetic backup set, the method comprising:
   creating a first incremental backup set of data objects, wherein
      the creating the first incremental backup set comprises copying data objects, including a first data object, from a memory to a first memory device;
   after creating the first incremental backup set of data objects, creating a second incremental backup set of data objects, wherein
      the creating the second incremental backup set comprises copying data objects, including a second data object, from the memory to a second memory device;
   determining whether the first incremental backup set is open for read access;
   copying the first data object from the first incremental backup set of data objects to a memory media for storing the synthetic backup set in response to determining the first incremental backup set is open for read access;
   determining whether the second incremental backup set is open for read access; and
   copying the second data object from the second incremental backup set of data objects to the memory media in response to determining the second incremental backup set is open for read access, wherein
      the second data object is copied to the memory media when both the first and second incremental backup sets of data objects are simultaneously open for read access.

2. The computer-implemented method of claim 1:
   wherein the first memory device comprises a first magnetic tape;
   wherein the second memory device comprises a second magnetic tape; and
   wherein the first and second magnetic tapes are simultaneously mounted on first and second tape drives, respectively, when the second data object is copied to the memory media.

3. The computer-implemented method of claim 2 wherein the memory media is a third magnetic tape.

4. The computer-implemented method of claim 2 wherein the memory media is a hard disk.

5. The computer-implemented method of claim 2 wherein the memory media is a logical disk.

6. The computer-implemented method of claim 1:
   wherein the first memory device comprises a first hard disk;
   wherein the second memory device comprises a second hard disk; and
   wherein the first and second hard disks are simultaneously mounted on first and second disk drives, respectively, when the second data object is copied to the memory media.

7. The computer-implemented method of claim 1 further comprising opening the first incremental backup set of data objects for read access, wherein opening the first incremental backup set of data objects for read access comprises reserving buffer memory for temporarily storing data objects read from the first incremental backup set of data objects.

8. A computer readable memory for storing instructions executable by a computer system, wherein the computer system implements a method in response to executing the instructions, the method comprising:
   determining whether a first incremental backup set is open for read access;
   in response to determining the first incremental backup set is open for read access, copying a first data object from the first incremental backup set of data objects to a memory media for storing a synthetic backup set, wherein the first incremental backup set of data objects was created by copying data objects, including the first data object, from a memory to a first memory device;
   determining whether a second incremental backup set is open for read access;
   in response to determining the second incremental backup set is open for read access, copying a second data object from the second incremental backup set of data objects to the memory media, wherein the second incremental backup set of data objects was created after the creation of the first incremental backup set of data objects, and wherein the second incremental backup set of data objects was created by copying data objects, including a second data object, from the memory to a second memory device; and
   wherein the second data object is copied to the memory media when both the first and second incremental backup sets of data objects are simultaneously open for read access.

9. The computer readable memory of claim 8:
   wherein the first memory device comprises a first magnetic tape;
   wherein the second memory device comprises a second magnetic tape; and
   wherein the first and second magnetic tapes are simultaneously mounted on first and second tape drives, respectively, when the second data object is copied to the memory media.

10. The computer readable memory of claim 9 wherein the memory media is a third magnetic tape.

11. The computer readable memory of claim 9 wherein the memory media is a hard disk.

12. The computer readable memory of claim 9 wherein the memory media is a logical disk.

13. The computer readable memory of claim 8:
   wherein the first memory device comprises a first hard disk;
   wherein the second memory device comprises a second hard disk; and
   wherein the first and second hard disks are simultaneously mounted on first and second disk drives, respectively, when the second data object is copied to the memory media.

14. The computer readable memory of claim 8 wherein the method further comprises opening the first incremental backup set of data objects for read access, wherein opening the first incremental backup set of data objects for read access comprises reserving buffer memory for temporarily storing data objects read from the first incremental backup set of data objects.

15. An apparatus comprising:
   a data storage subsystem comprising a memory media;
   a computer system coupled to the data storage subsystem, wherein the computer system comprises a computer readable memory for storing instructions executable by the computer system, wherein the computer system implements a method in response to executing the instructions, the method comprising:
   determining whether a first incremental backup set is open for read access;
   in response to determining the first incremental backup set is open for read access, copying a first data object from the first incremental backup set of data objects to a memory media for storing a synthetic backup set, wherein the first incremental backup set of data objects was created by copying data objects, including the first data object, from a memory to a first memory device;

determining whether a second incremental backup set is open for read access;

in response to determining the second incremental backup set is open for read access, copying a second data object from a second incremental backup set of data objects to the memory media, wherein the second incremental backup set of data objects was created after the creation of the first incremental backup set of data objects, and wherein the second incremental backup set of data objects was created by copying data objects, including a second data object, from the memory to a second memory device; and wherein the second data object is copied to the memory media when both the first and second incremental backup sets of data objects are simultaneously open for read access.

16. The apparatus of claim 15:

wherein the first and second memory devices comprise first and second magnetic tapes mounted on first and second tape drives, respectively; and wherein the first and second magnetic tapes are simultaneously mounted on the first and second tape drives, respectively, when the second data object is copied to the memory media.

17. The computer-implemented method of claim 1, further comprising:

creating a catalog, wherein the catalog lists a plurality of data object stored on a primary volume, and the catalog lists an order in which the plurality of data objects are to be copied to the memory media for storing the synthetic backup set.

18. The computer readable memory of claim 8, wherein the method further comprises:

creating a catalog, wherein the catalog lists a plurality of data object stored on a primary volume, and the catalog lists an order in which the plurality of data objects are to be copied to the memory media for storing the synthetic backup set.

19. The apparatus of claim 15, wherein the method further comprises:

creating a catalog, wherein the catalog lists a plurality of data object stored on a primary volume, and the catalog lists an order in which the plurality of data objects are to be copied to the memory media for storing the synthetic backup set.

20. The computer-implemented method of claim 1, wherein the second data object is copied to the memory media when both the first and second incremental backup sets of data objects are open for read access at a given time, and the second data object is copied to the memory media before the first incremental backup set of data object is closed.

* * * * *

UNITED STATES PATENT AND TRADEMARK OFFICE
CERTIFICATE OF CORRECTION

| | | |
|---|---|---|
| PATENT NO. | : 9,075,819 B1 | Page 1 of 1 |
| APPLICATION NO. | : 11/395040 | |
| DATED | : July 7, 2015 | |
| INVENTOR(S) | : Escabi, II et al. | |

It is certified that error appears in the above-identified patent and that said Letters Patent is hereby corrected as shown below:

In the claims

Column 11
Line 66, Claim 8, replace: "backup set is open" by -- backup set of data objects is open --

Column 12
Line 2, Claim 8, insert: -- of data objects -- immediately before "is open"
Line 8, Claim 8, replace: "backup set is" by -- backup set of data objects is --
Line 11, Claim 8, replace: "set is open" by -- set of data objects is open --
Line 63, Claim 15, replace: "backup set is open" by -- backup set of data objects is open --
Line 66, Claim 15, insert: -- of data objects -- immediately before "is open"

Column 13
Line 5, Claim 15, replace: "backup set is" by -- backup set of data objects is --
Line 8, Claim 15, replace: "set is open" by -- set of data objects is open --

Signed and Sealed this
Seventeenth Day of May, 2016

Michelle K. Lee
*Director of the United States Patent and Trademark Office*